United States Patent
Pagano et al.

[19]

[11] Patent Number: 5,944,404
[45] Date of Patent: Aug. 31, 1999

[54] DEFINED ORIENTATION SLIDE PROJECTOR AND SLIDES

[75] Inventors: Daniel M. Pagano, Honeoye Falls; David L. Patton, Webster; Dale F. McIntyre, Honeoye Falls; Edward Weissberger, Pittsford, all of N.Y.

[73] Assignee: Eastman Kodak Company, Rochester, N.Y.

[21] Appl. No.: 08/897,169

[22] Filed: Jul. 18, 1997

[51] Int. Cl.⁶ .................................................. G03B 21/14
[52] U.S. Cl. .......................................... 353/105; 353/107
[58] Field of Search .................................. 353/103, 105, 353/108, 111, 115, 117, 118, 95; 206/455, 456

[56] References Cited

U.S. PATENT DOCUMENTS

| | | |
|---|---|---|
| 2,655,833 | 10/1953 | Krows . |
| 3,203,123 | 8/1965 | Dominy . |
| 3,269,261 | 8/1966 | Porter . |
| 3,468,603 | 9/1969 | Kovarik et al. . |
| 3,480,356 | 11/1969 | Dimitracopoulos . |
| 3,551,045 | 12/1970 | Nerwin et al. . |
| 3,601,482 | 8/1971 | Harvey . |
| 3,881,814 | 5/1975 | Madison, II . |
| 3,981,570 | 9/1976 | Ashida et al. . |
| 4,005,530 | 2/1977 | Takahashi et al. . |
| 4,067,647 | 1/1978 | Gallina . |
| 4,083,631 | 4/1978 | Gugeler . |
| 4,122,613 | 10/1978 | Karalus et al. . |
| 4,165,159 | 8/1979 | Landau et al. . |
| 4,363,055 | 12/1982 | Lee . |
| 4,385,814 | 5/1983 | Elliott . |
| 4,420,234 | 12/1983 | Dolejsi et al. . |
| 4,434,467 | 2/1984 | Scott . |
| 4,548,486 | 10/1985 | Mosley .................................. 353/95 |
| 4,568,161 | 2/1986 | DiGianfilippo et al. . |
| 4,616,926 | 10/1986 | DiPietro et al. . |
| 4,765,734 | 8/1988 | Truc et al. . |
| 4,791,496 | 12/1988 | Kageyama et al. . |
| 5,126,863 | 6/1992 | Otsuka et al. . |
| 5,214,460 | 5/1993 | Chuan ................................... 353/103 |
| 5,223,870 | 6/1993 | Ozeki ..................................... 353/95 |
| 5,265,726 | 11/1993 | Johnson . |
| 5,317,436 | 5/1994 | Spitzer et al. . |
| 5,363,156 | 11/1994 | Tianello et al. . |
| 5,376,979 | 12/1994 | Zavracky et al. . |
| 5,396,304 | 3/1995 | Salerno et al. . |
| 5,428,415 | 6/1995 | Keelan et al. .......................... 353/95 |
| 5,428,417 | 6/1995 | Lichenstein . |
| 5,526,011 | 6/1996 | Hix et al. . |
| 5,803,565 | 9/1998 | McIntyre et al. ..................... 353/26 A |

OTHER PUBLICATIONS

U. S. Patent Application Ser. No. 08/775,326, entitled: "Film Slides Having Encoded Data and Methods for Preparing Film Slides", filed Dec. 31, 1996 by Dale F. McIntyre et al.

*Primary Examiner*—William Dowling
*Attorney, Agent, or Firm*—Robert Luke Walker

[57] ABSTRACT

A film slide projector has a rail which engages a carousel in a complementary manner, such that a surface of the rail contacts a surface of each film slide in the carousel. Misoriented film slides are moved by the surface of the rail to expose a portion of such misoriented film slides outside of respective slots of the carousel to indicate such misorientation. Film slides having a predetermined proper orientation are completely contained within respective slots. The predetermined proper orientation of each film slide is determined by a cut-out portion capable of engaging the rail. Alternatively, a carousel may have walls forming slots with a rectangular cross-sectional cylindrical element protruding from a wall to cause misoriented film slides positioned thereupon to have a respective portion thereof extending through a respective open aperture to indicate misorientation. Alternatively, a magnetic head may be used for generating detection signals by detecting magnetic material on film slides, with a processor for determining the orientation of the slide and for controlling the generation of images from the film slide.

21 Claims, 9 Drawing Sheets

DEFINED ORIENTATION SLIDE PROJECTOR AND SLIDES

CROSS REFERENCE TO RELATED APPLICATIONS

Reference is made to commonly assigned co-pending U.S. patent applications Ser. No. 08/775,677, entitled: METHOD AND APPARATUS FOR PREPARING PHOTOGRAPHIC FILM UNITS HAVING IMAGE FRAME ASSOCIATED ENCODED INFORMATION, and filed in the names of Richard Bauer, Dale McIntyre, Daniel Pagano, David Patton, and Edward Weissberger; Ser. No. 08/775,326, entitled: FILM SLIDES HAVING ENCODED DATA AND METHODS FOR PREPARING FILM SLIDES, and filed in the names of Dale McIntyre, Daniel Pagano, David Patton, and Edward Weissberger; Ser. No. 08/775,814, entitled: FILM SLIDES HAVING DATA WINDOWS, and filed in the names of Dale McIntyre, Daniel Pagano, David Patton, and Edward Weissberger; Ser. No. 08/775,321, entitled: ORIENTING PROJECTOR, and filed in the names of Dale McIntyre, Daniel Pagano, David Patton, and Edward Weissberger; Ser. No. 08/775,816, entitled: FORMATTING PROJECTOR, and filed in the names of Dale McIntyre, Daniel Pagano, David Patton, and Edward Weissberger; Ser. No. 08/775,847, entitled: ANNOTATION DISPLAYING PROJECTOR, and filed in the names of Dale McIntyre, Daniel Pagano, David Patton, and Edward Weissberger; U.S. patent application Ser. No. 08/896,841 entitled: FILM SLIDE AND FILM EXTRACTOR, and filed in the names of Daniel Pagano, Dale McIntyre, David Patton, and Edward Weissberger; U.S. patent application Ser. No. 08/896,374 entitled: FILM ORIENTING SLIDE MOUNTER AND METHOD, and filed in the names of David Patton, Daniel Pagano, Dale McIntyre, and Edward Weissberger; U.S. patent application Ser. No. 08/897,171 entitled: FILM SEGMENT PRINTING SYSTEM AND METHOD, and filed in the names of David Patton, Daniel Pagano, Dale McIntyre, and Edward Weissberger; U.S. patent application Ser. No. 08/896,844 entitled: SLIDE WITH MAGNETIC MARKS THAT CAN BE READ BY MULTIPLE HEADS, and filed in the names of Dale McIntyre, Daniel Pagano, David Patton, and Edward Weissberger; each of which are assigned to the assignee of this application.

FIELD OF THE INVENTION

This invention relates generally to the field of slide projectors, and in particular to film slide projectors and slides for use with such film slide projectors having a defined orientation.

BACKGROUND OF THE INVENTION

Slide trays, such as rotatable carousels, are used to load and hold film slides for sequential and/or controlled loading into a receiving area of a projector. In the receiving area, a light source and optionally a lens are used to generate images from the film segment of a received slide. Typical slides are symmetrical about multiple axes which facilitate mounting of film slides into the slide mounts of the slides. Such symmetrical construction, however, also facilitates misorientation of the slides, since the flipping of the slide about one or more axes away from a proper orientation may not be readily detectable until the projector generates images therefrom which then appear misoriented. Such misorientation of the slides and images may causes inconvenience and/or embarrassment; for example, when presenting such images to a mass audience.

Device are known for correcting the orientation of slides in a slide tray. For example, U.S. Pat. No. 5,265,726 describes a slide tray having a rail which allows an operator to determine, if a tray cover does not fit properly over the slide tray, that there is at least one slide which is not oriented properly. The particular misoriented slide may be determined subsequently by removing the tray cover, visually reviewing the slides in the slide tray to properly orient the slides, and then attempting to secure the tray cover again to determine if any further slides are misoriented.

A need exists for a projector and components thereof for readily determining which particular slide or slides of a set of slides is misoriented.

SUMMARY OF THE INVENTION

It is recognized herein that the detection of misoriented slides may be improved by the use of contacting surfaces between slides and portions of the projector. A generally annular rail may be used to engage cavities in a slide carousel as well as cut-out portions of slides such that misoriented slides do not engage the annular rail in a complementary manner and so are readily detectable by an operator prior to acceptance into the projector for imaging. In addition, the use of a pivoting actuator lever facilitates the detection of such misoriented slides prior to acceptance into the projector for imaging.

Other embodiments provide slots in the carousel which are divided into a portion which detects misoriented slides and accepts properly oriented slides, and which allows a removal arm to remove properly oriented slides from the portion of the slot to be received into the projector for imaging.

Further embodiments use magnetic heads in the projector for reading data from magnetic material on each slide, with the magnetic material being used to determine whether the slide is properly oriented or misoriented prior to imaging from the slides. Misoriented slides may then be rejected and ejected from the projector as well as from the carousel of slides.

BRIEF DESCRIPTION OF THE DRAWINGS

The features and advantages of the present invention will be readily apparent, and are to be understood, by referring to the following detailed description of the preferred embodiments of the present invention, taken in conjunction with the accompanying drawings, in which.

DETAILED DESCRIPTION OF THE INVENTION

Figure 1:
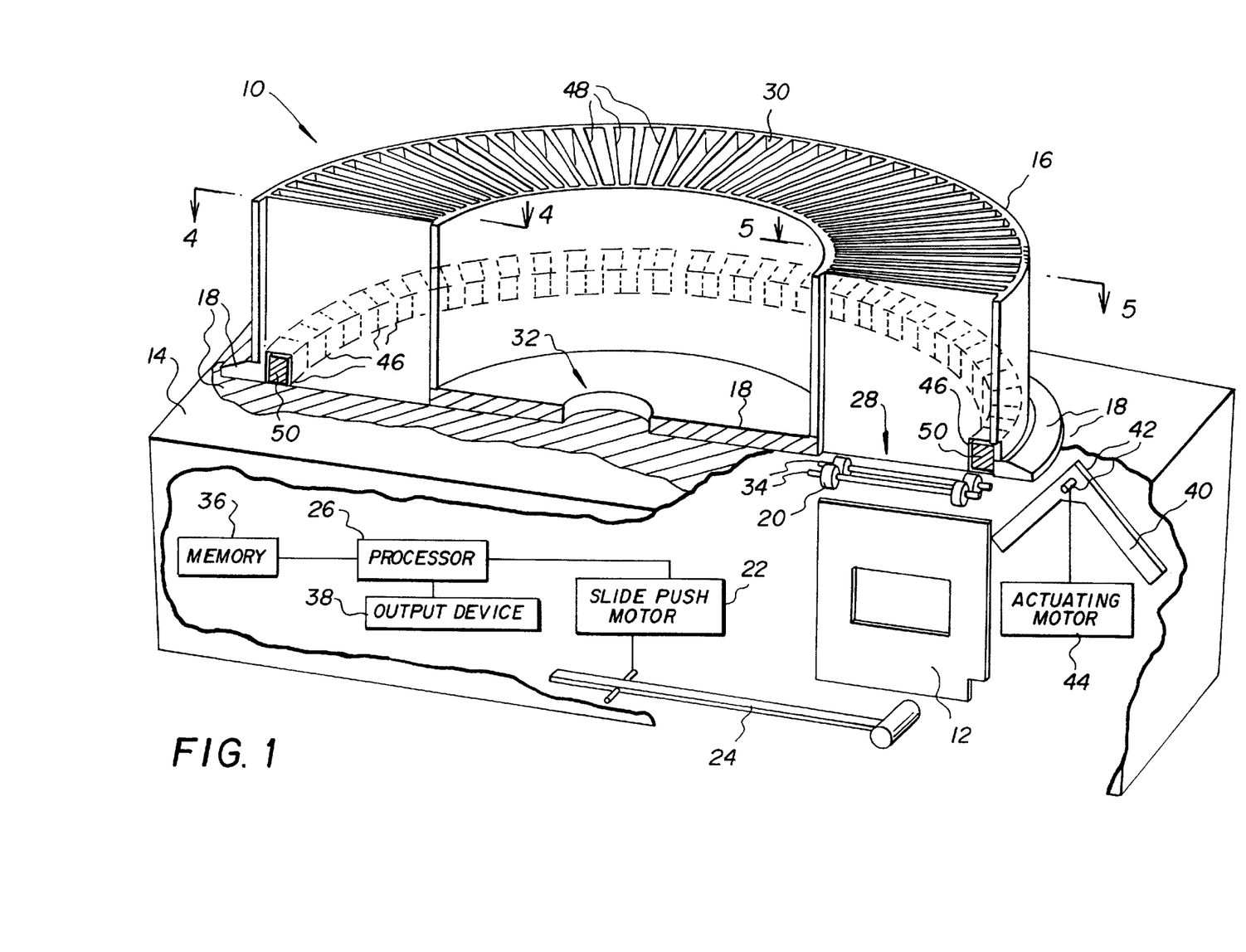
FIG. 1 is a perspective cut-away view of a slide projector.

Referring in specific detail to the drawings, with common reference numbers identifying similar or identical elements, steps, and features, as shown in FIG. 1, the present invention is directed to a slide projector 10 and a slide 12 for use therewith having a predetermined defined orientation feature for ensuring proper orientation and display of the slide 12.

The slide projector 10 includes a housing 14, a carousel 16, and a base 18. The housing 14 includes components known in the art for receiving the slide 12 and for generating images therefrom using a light source and a lens (not shown in FIG. 1). The carousel 16 stores a plurality of the slides 12 such that, as each slide 12 is positioned above a receiving area upon rotation of the carousel 16, the slide 12 is received into the housing 14 by dropping down due to gravity to engage at least one roller 20 to be positioned in the receiving area below the roller 20 and internal to the housing 14 and in the path of light from the light source.

To eject the received slide 12 from the receiving area, a slide push motor 22 activates a slide push lever 24 to slidably engage and lift the slide 12 into the carousel 16. The carousel 16 then rotates to move the slide 12 away from a position above the receiving area. Another slide in another slot may then be positioned above the receiving area to drop into the housing 14 for display of the image therefrom.

The carousel 16 is shaped in an annular configuration and slidably mounted upon a circular or annular base 18, which in turn is mounted upon the housing 14. As is known in the art and as shown in a disclosed base 18 in FIG. 20, the base 18 includes a receiving slot 28 which is positioned above the roller 20 and above the receiving area for allowing a slide 12 to pass from the carousel 16 to the receiving area internal to the housing 14.

The carousel 16 includes a plurality of slots 30 open at both the top and the bottom of the carousel 16. The slots 30 are dimensioned so that at least one slide may be positioned therein. As a result, the carousel 16 is adapted to hold a plurality of slides 12. The carousel 16 may be removably mounted upon the base 18 for insertion of slides, cleaning, storage, transfer and travel, etc. The base 18 may also be removably mounted upon the housing 14. When coupled with the carousel 16, the base 18 effectively closes the bottom end of each of the plurality of slots 30, except for a single slot above the receiving slot 28. Thus, a plurality of slides may be held within the combination of the carousel 16 and the base 18.

The housing 14 includes a processor 26 which controls the slide push motor 22 and a carousel motor (not shown in FIG. 1) for rotating the carousel 16 thereupon about a central aperture 32. The processor 26 may be a commercially available microprocessor and/or a microcontroller, such as the MC68HC05 microcontroller available from "MOTOROLA", for executing predetermined software and/or firmware routines to respond, for example, to operator inputs through an input device (not shown in FIG. 1).

In response to rotation input signals from the input device such as a hand-held switch, actuated by a user in a manner known in the art, the processor 26 generated control signals to control the carousel motor to rotate the carousel 16 for causing a single slide 12 to be received, as described above. In response to ejection input signals from the input device, the processor 26 controls the slide push motor 22 to pivot the slide push lever 24 to eject the current slide 12 from the receiving area, as described above.

The housing 14 may also include a roller motor (not shown in FIG. 1) for controlling the rotation of the at least one roller 20 about at least one axle 34. The processor 26 may generate control signals for controlling the roller motor to control the speed of reception of the slide 12 from the slot above the carousel 16 and/or to control the speed of ejection of the slide 12 from the housing 14.

The disclosed slide projector 10 may also include a memory 36 for storing predetermined data for use by the processor 26, as well as an output device 38 for generating outputs, as described below. The memory 36 and the output device 38 may be disposed within the housing 14 and connected to the processor 26.

The disclosed slide projector 10 also includes an actuator lever 40 for guiding an ejected slide into a respective slot in the carousel 16 in preparation for rotation of the carousel 16 to position another slide over the receiving slot 28 and the receiving area. The actuator lever 40 is capable of pivoting about pins 42 in response to operation of an actuating motor 44 connected to and controlled by the processor 26.

The disclosed slide projector 10 includes a predetermined or defined orientation feature which insures that each slide 12 received in the receiving area for imaging is in a predetermined correct orientation. For example, the orientation feature insures that the images projected from the received slide 12 are not backwards and/or upside down; that is, the images are not rotated about at least one axis. Such proper orientation minimizes the inconvenience and/or embarrassment to the user from displaying images incorrectly to an audience.

In a first embodiment as shown in FIG. 1, the disclosed slide projector 10 includes a plurality of cavities 46 in each one of the respective walls 48 forming the slots 30 of the carousel 16. The plurality of cavities 46 form a generally annular cavity about the lower periphery of the carousel 16. The disclosed slide projector 10 also includes a rail 50 which fits into the plurality of cavities 46 in a slidable engagement; that is, when the carousel 16 is mounted onto the base 18, each of the plurality of cavities 46 is positioned upon a respective portion of the rail 50 in a slidable engagement. Accordingly, when the carousel 16 is rotated, a lower edge of each of the plurality of cavities 46 slides on the rail 50.

The rail 50 may be mounted to the base 18. Alternatively, the rail 50 may be a separate and independent component which is positioned between the lower edge of each of the plurality of cavities 46 and the base 18.

Figure 2:
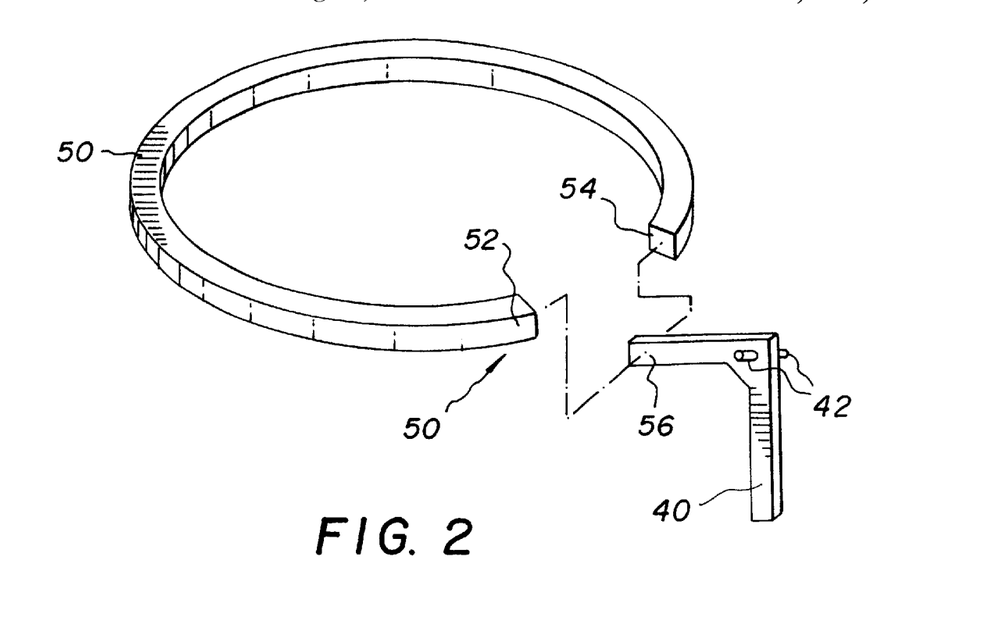
FIGS. 2 and 3 are perspective views with parts separated of a rail engaging an actuator lever.

The rail 50 is substantially annular, except for a cut-out portion forming a spacing, which is positioned over the receiving slot 28 of the base 18 to allow passage of the received slide 12 therethrough. As shown in FIG. 2, in a cut-away view, the rail 50 includes a pair of ends 52 and 54 between which a first end 56 of the actuator lever 40 is positioned. Accordingly, the pair of ends 52 and 54 form the cut-out portion therebetween for passage of the slide 12 therethrough when the actuator lever 40 has the first end 56 pivoted downward, as shown in FIG. 1.

Figure 3:
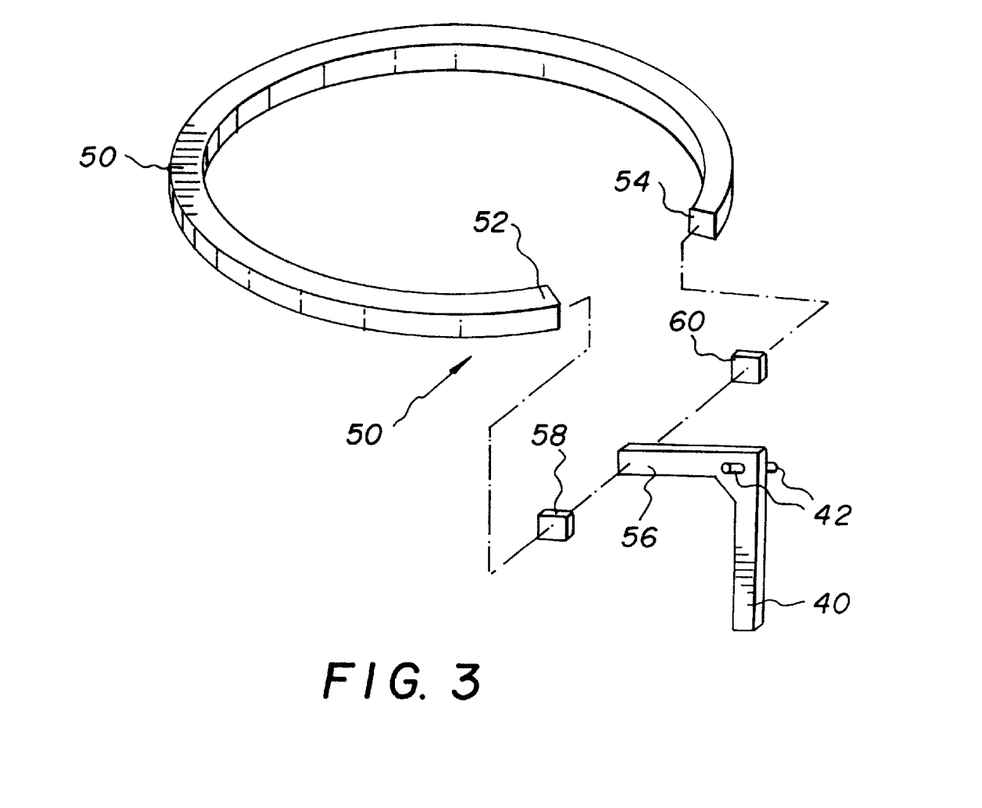

In an alternative embodiment shown in FIG. 3, each of the ends 52 and 54 of the rail 50 are substantially adjacent to one of a pair of channel portions 58 and 60. The pair of channel portions 58 and 60 form a channel through which the slide 12 passes when the actuator lever 40 has the first end pivoted downward, as shown in FIG. 1. The channel portions 58 and 60 may mounted to the base 18 on opposing sides of the receiving slot 28.

As shown in FIGS. 1–3, the rail 50, the channel portions 58 and 60, each of the cavities 46, and the first end 56 of the actuator lever 40 have a generally rectangular cross-section. Alternative embodiments of the rail 50, the channel portions 58 and 60, each of the cavities 46, and the first end 56 of the actuator lever 40 may be implemented, such as embodiments having triangular cross-sections, circular or curved cross-sections, etc., provided that the cross-sections of rail 50, the channel portions 58 and 60, and the first end 56 of the actuator lever 40 substantially complement the shape of each of the cavities 46, and each of the cavities 46 has a substantially uniform shape. Such complementary engagement of the rail 50, the channel portions 58 and 60, each of the cavities 46, and the first end 56 of the actuator lever 40 allows for a slidable engagement therebetween to permit substantially unimpeded rotation of the carousel 16.

Figures 4, 5:
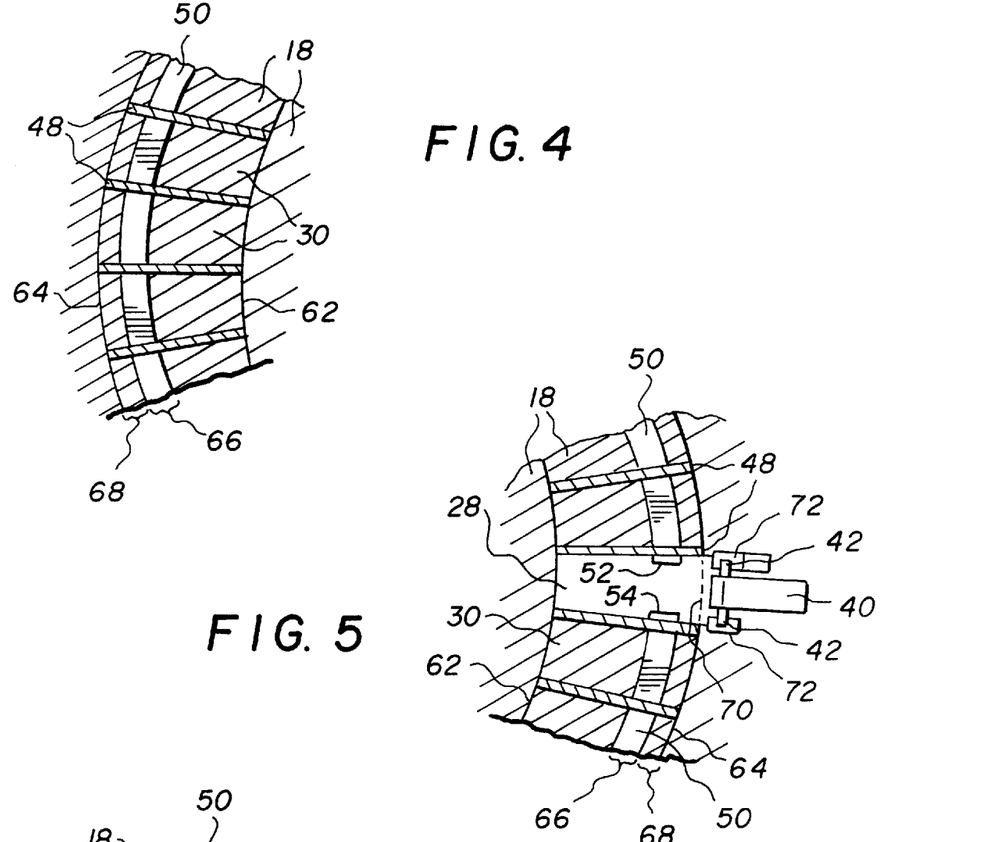
FIG. 4 is a top cross-sectional view of a portion of the carousel in FIG. 1 along lines 4—4.
FIGS. 5 and 6 are top cross-sectional views of alternative embodiment of a portion of the carousel in FIG. 1 along lines 5—5.
Figure 6:
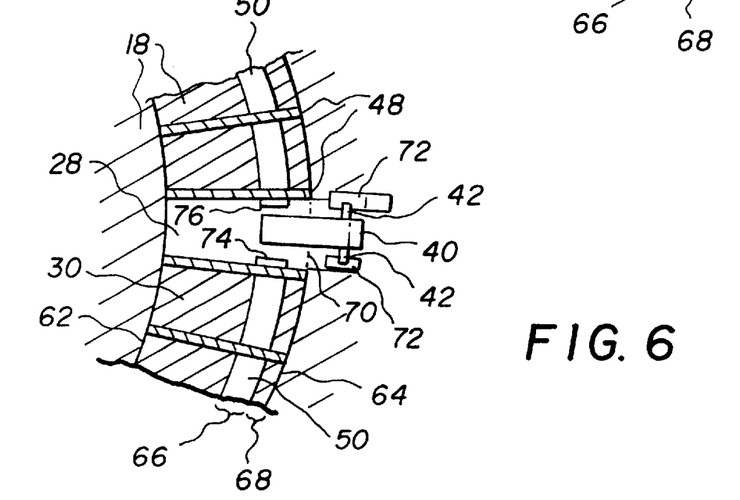

FIGS. 4–6 illustrate top planar views of sections of the carousel 16 shown in FIG. 1. As shown in FIG. 4 which is a top plan view along the lines 4—4 of FIG. 1, the rail 50 is positioned over the base 18 and extends through the cavities 46 (not shown in FIG. 4) of the walls 48 of the slots 30. The rail 50 has generally identical curvature as the inner peripheral surface 62 and/or the outer peripheral surface 64 of the carousel 16. The rail 50 has a substantially constant width 66 and is spaced, for example, at a substantially constant distance 68 from the outer peripheral surface 64. It is understood that the rail may be positioned in any location relative to the inner peripheral surface 62 and the outer peripheral surface 64, and may also abut either of the peripheral surfaces 62 and 64, provided that such positioning of the rail 50 substantially matches the positions of each of the cavities 46, and optionally the channel portions 58 and 60, relative to, for example, the outer peripheral surface 64. Alternatively, the cavities 46 may be open at the outer peripheral surface 64 such that the rail 50 extends from the interior of the annular slots 30 of the carousel 16 to the outside of the carousel 16. Accordingly, the rail 50 may have a raised portion outside of the outer peripheral surface 64 as a circumferential guide to contain the carousel 16 during rotation.

As shown in FIG. 5 which is a top plan view along the lines 5—5 of FIG. 1, the rail 50 extends through the walls 48 of the slots 30, with the ends 52 and 54 of the rail 50 optionally extending partially into the receiving slot 28. The portion 70 of the outer peripheral surface 64 of the carousel 16 above the receiving slot 28 is shown in the dotted line in FIGS. 5 and 6, with a space below the portion 70 permitting entry and positioning of the actuator lever 40. The actuator lever 40 is oriented in FIG. 5 such that the first end 56 is pivoted downward, and so is not shown in FIG. 5. The actuator lever 40 pivots about the pins 42 mounted on base units 72, in which at least one of base units 72 is connected to the actuating motor 44 for pivoting the actuator lever 40. It is understood that other pivoting mechanisms known in the art may be used, such as a screw-engagement with a wheel attached to at least one of the pins 42.

Accordingly, as the carousel 16 rotates a slide 12 over the receiving slot 28, the downwardly pivoting position of the first end 56 and the ends 52 and 54 of the rail form a clear opening for passage downward of the slide 12 into the receiving slot 28.

As shown in FIG. 6, which is an alternative top plan view along the lines 5—5 of FIG. 1 with the first end 56 of the actuator lever 40 pivoted upward, the actuator lever 40 extends the first end 56 thereof into the receiving slot 28 such that a first edge 74 is substantially contiguous with inner edge 76 of the ends 52 and 54 of the rail 50. In addition, a top surface of the first end 56 is substantially contiguous with the top surface of the ends 52 and 54 of the rail 50. Accordingly, upon rotation of a slot 30 having a slide 12 of the carousel 16 to position the slot 30 and slide 12 over the receiving slot 28, the slide 12 is positioned over the receiving slot 28 but moves from at least one of the ends 52 and 54 of the rail 50 onto the first end 56 of the actuator lever 40. The slide 12 is then positioned upon the first end 56 and does not pass through the receiving slot 28 until the actuator lever 40 pivots the first end 56 downward, as shown in FIG. 1.

Figure 9:
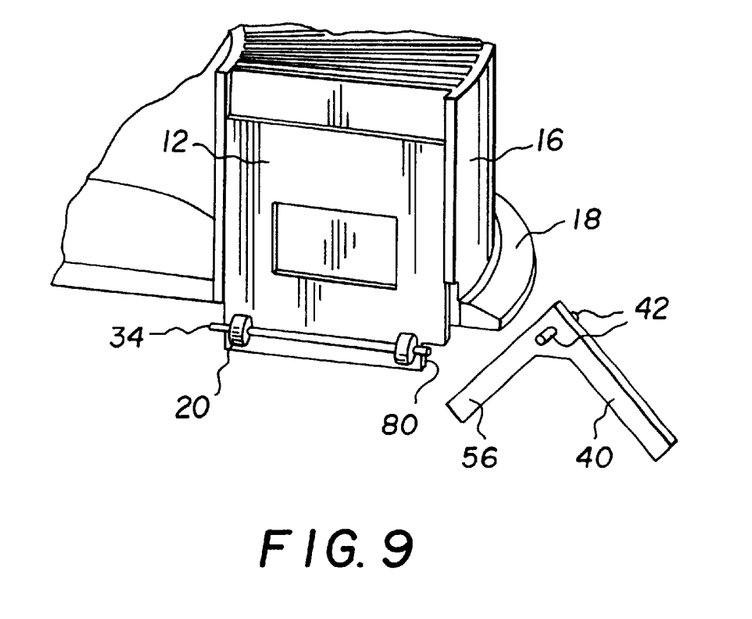
Figure 10:
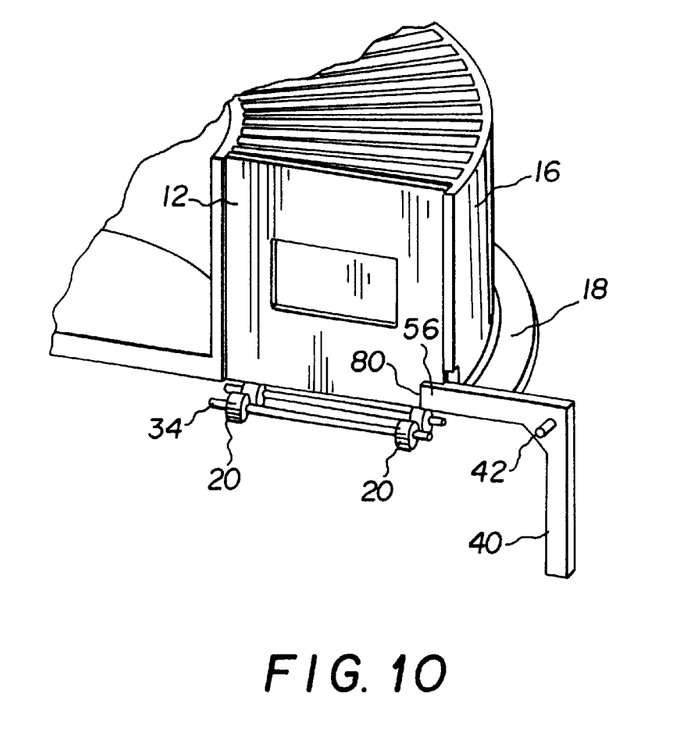

Alternatively, the actuator lever 40 may normally have the first end 56 pivoted downward, such that the receiving slot 28 is clear, as shown in FIG. 5, to allow slides to pass through. The actuator lever 40 may then pivot the first end 56 upward when a slide is being ejected, as shown in FIG. 9, in order to align the ejected slide with the rail 50, as shown in FIG. 10, for subsequent rotation of the carousel 16.

Figure 7:
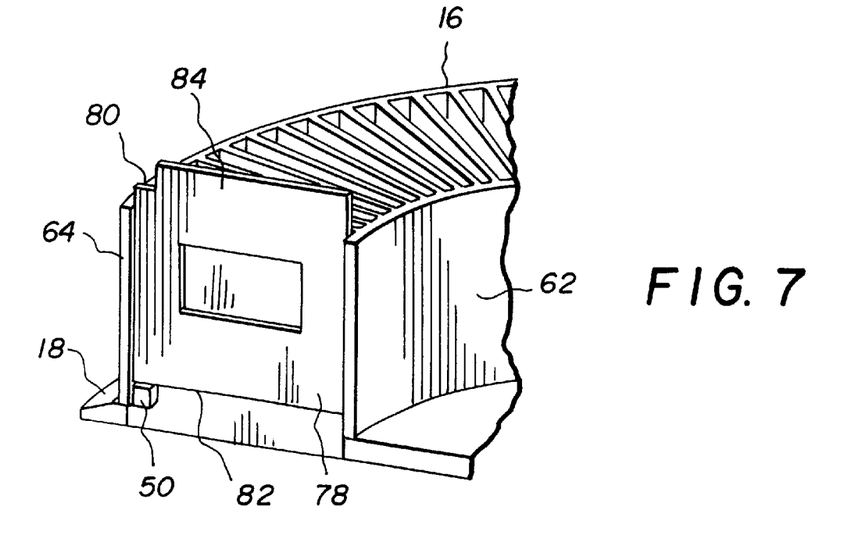
FIG. 7 is a perspective cut-away view of a Disoriented slide in a slot.

As shown in FIG. 7, in a first embodiment, the disclosed slide projector 10 includes a defined orientation feature implemented by the rail 50, which determines whether a slide inserted into a respective slot is in the defined orientation for proper operation of the slide projector 10. Slides having a predetermined cut-out portion 80 in a predetermined location on the slide mount thereof may be properly oriented in the disclosed carousel 16 by the disclosed rail 50 of the disclosed slide projector 10. When a misoriented slide 78 illustrated in FIG. 7 is placed in a slot such that the predetermined cut-out portion 80 does not engage the rail 50, at least one edge or surface 82 of the misoriented slide 78 prevents the misoriented slide 78 from being substantially positioned within the slot.

For example, the misoriented slide 78 may have a portion 84 extending out of the carousel 16, which readily indicates to the operator and/or the person loading slides into the carousel 16 that the misoriented slide 78 is not positioned in the predetermined proper orientation. The operator may correct the orientation of the misoriented slide 78 by removing the misoriented slide 78 from the slot and flipping the misoriented slide 78 about at least one axis of symmetry thereof until the misoriented slide 78 and the cut-out portion 80 thereof are oriented properly. That is, the misoriented slide 78 is to be oriented such that the cut-out portion 80 may engage the rail 50 in a substantially complementary configuration. In the illustrative embodiment shown in FIG. 7, the rail 50 is substantially adjacent to the outer peripheral surface 64 of the carousel 16.

In alternative embodiments, with the slots 30 being radially oriented in the carousel 16, the rail 50 may be at any position along the radial length of the slot, for example, centrally located, or located substantially adjacent to the inner peripheral surface 62 of the carousel 16. In such alternative embodiments, it is understood that the actuator lever 40 may be configured; for example, to provide the substantially contiguous surface with the rail 50 for allowing the slides in the slots 30 to move onto the first end 56 during rotation of the carousel 16. Such a configuration of the actuator lever 40 with the rail 50, determined by the position of the rail 50 within the slots 30, allows the slides to be slidably moved from the rail 50 to the first end 56 of the actuator lever 40 and subsequently back to the rail 50 during rotation of the carousel 16.

The slides used in the disclosed carousel 16 are to be constructed such that the cut-out portions thereof are positioned in a predetermined location on the slide mount to cause a predetermined orientation of the respective slide within the slot by engaging the rail 50. The predetermined orientation of the slide is to allow for the properly oriented generation of images from the slide when the slide enters the receiving area internal to the slide projector 10 and has light applied thereto.

The processor 26 may use the data stored in the memory 36 to generate and output a status message, such as an OK message to the projector operator by the output device 38, such as an indicator, a display or an audio speaker. For example, the output device 38 may include light emitting diodes (LEDs) of different colors which are illuminated to indicate the status of the orientation of a slide. A red LED may be lit if a misoriented slide is detected by the projector 10, and a green LED may be lit if a slide is detected to be properly oriented. In addition, the memory 36 may store data corresponding to predetermined text for display on a liquid crystal display (LCD), or may store data corresponding to pre-recorded speech messages to announce the status of the orientation through a speaker.

Alternative to or in combination with the extension from the slot of the portion 84 of the misoriented slide 78, other devices or elements may be used to indicate a misorientation of the slide 78. For example, written indicia and/or color coding on the edges and surfaces of the slides as well as on the top edges of the walls 48 of the slots 30 may be used to indicate to the operator that the slides are to be re-oriented. With a slide having a "top" surface, a "bottom" surface, and opposite lateral side surfaces, the lateral side surfaces of each of the slides may be colored, for example, red and green, respectively, to match red and green indicators on the inner peripheral surface 62 and the outer peripheral surface 64 of the carousel 16.

In addition, with slides 12 and 78 having cut-out portions or notches such as cut-out portion 80, at least one surface of the slides 12 and 78 may be electrically conductive and/or magnetic and the rail 50 and/or the base 18 may also be conductive and/or magnetic, such that proper orientation completes an electrical and/or magnetic circuit therebetween to provide a flow of energy from a power source (not shown in FIG. 1). Such a complete circuit may then be detected by an appropriate electrical or magnetic sensor (not shown in FIG. 1) to generate a signal processed by the processor 26. Misorientation of the slide 78 may then cause an incomplete circuit, which is detected by the sensor to cause the generation of a misorientation message to be output as the status message to the projector operator.

Other misorientation sensors may be used, such as pressure or proximity sensors for detecting contact of the cut-out portion of the slide and the surfaces of the slide relative to the rail 50 and the base 18. Proper orientation may be characterized by having more contacting surface area and/or pressure between the slide and the base 18 and rail 50, while misorientation is characterized by a lesser amount of contacting surface area and/or pressure, with such discrepancies being detected by an appropriate sensor for generating appropriate status messages using the processor 26 and the output device 38.

Figure 8:
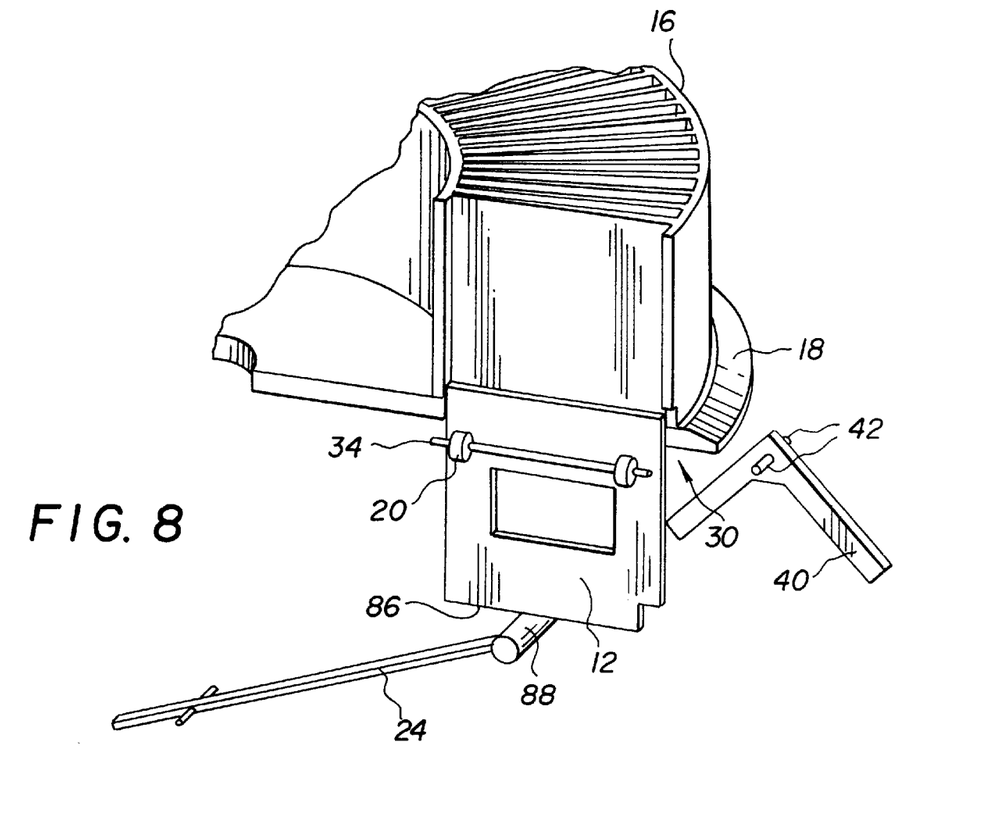
FIGS. 8–10 are perspective cut-away views of a properly oriented slide being progressively ejected back into a carousel.

Referring to FIGS. 8–10, after a properly oriented slide 12 shown in FIG. 1 is received and images are generated therefrom, the slide 12 is then ejected by activation of the slide push motor 22 in response to ejection control commands generated by the processor 26. As shown in FIG. 8, the slide push motor 22 pivots the slide push lever 24 to engage a bottom surface 86 of the slide 12 with an engaging end 88 to push the slide 12 upward and through the receiving slot 28 and through the rollers 20. In one embodiment, the engaging end 88 may be rounded to slidably engage the bottom surface 86 during the lifting of the slide 12. Alternatively, the engaging end 88 may have a flat surface, may have a roller attached to an axle for rolling along the bottom surface 86 while lifting the slide 12, may have a flat surface which contacts and lies flush with the bottom surface and which pivots about the end of the slide push lever 24 to maintain a flush contact, may be coated with polytetrafluroethylene-based materials, such as "TEFLON", for reduced frictional contact, etc.

In one embodiment, the rollers 20 may be passive; that is, the rollers 20 merely provide sufficient guidance for the passage of the slide 12 through the receiving slot 28. In an alternative embodiment, the rollers 20 may be active such that a roller motor (not shown in FIG. 1), controlled by control signals from the processor 26, rotates the rollers 20 about the axles 34 to lower the slide 12 downward or to lift the slide 12 upward.

As shown in FIG. 10, once the slide 12 has been lifted into the slot in the carousel 16 above the receiving slot 28, the actuator lever 40 then pivots upward so that the first end 56 engages the cut-out portion 80 of the slide 12, as described above, so that rotation of the carousel 16 with the lifted slide 12 may be performed. Alternatively, the actuator lever 40 may be timed to pivot as slide 12 is lifted, so that the first end 56 gradually engages the cut-out portion 80 of the slide 12, and fully engages the cut-out portion 80 when the slide 12 is fully positioned in the carousel 16. The timing of the pivoting of the actuator lever 40 may be controlled by the processor 26 implementing or connected to a timing circuit.

Figure 11:
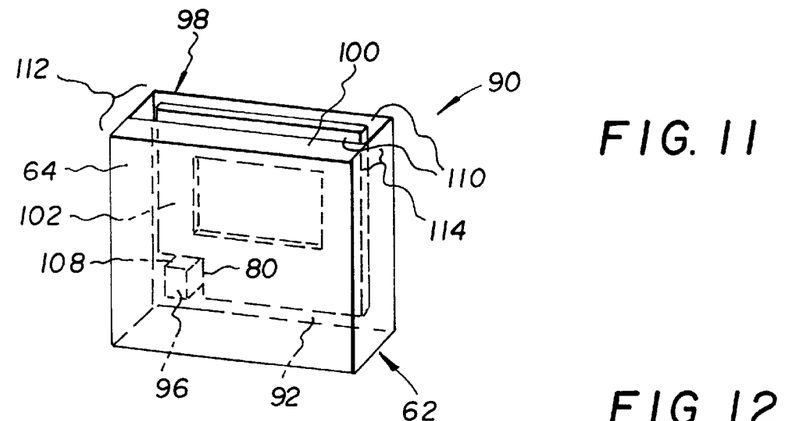
FIG. 11 is a perspective cross-sectional view of an alternative embodiment of a slot for positioning a slide.
Figure 12:
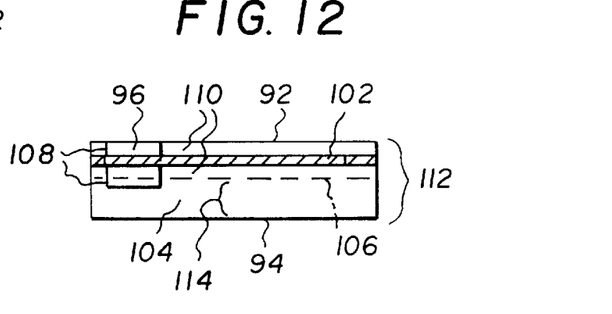
FIG. 12 is a top plan view of the slot in FIG. 11.

The disclosed slide projector 10 uses a substantially contiguous annular rail 50 passes through the cavities 46 in the walls 48 of the slots 30 to provide the orientation feature, with the actuator lever 40 assisting in retaining an ejected slide in the carousel 16 during rotation of the ejected slide away from the receiving slot. In an alternative embodiment shown in FIGS. 11–15, the disclosed slide projector 10 does not utilize such components as the rail 50, the cavities 46, and the actuator lever 40. In FIGS. 11–15, each of the slots of the carousel 16 may be implemented as a slot 90 with solid walls therebetween, such as a first wall 92 and a second wall 94. A rectangular cross-sectional cylindrical block 96 is mounted on the first wall 92 and extends partially but not completely in the slot 90, as shown in FIG. 12. The bottom of the slot 90 is open, but the top of the slot 90 has an open portion 98 and a cover portion 100, with the open portion 98 being an aperture or passage for allowing a slide 102 to be placed into the slot 90 to rest on the block 96.

Figure 14:
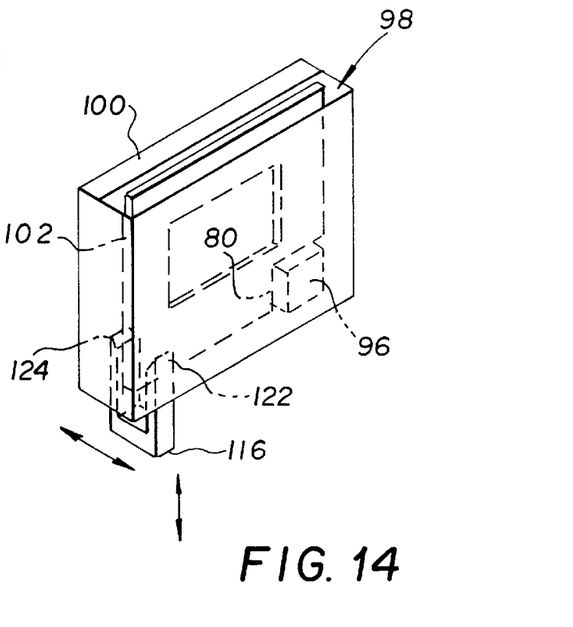
FIG. 14 is a perspective cross-sectional view of the slot in FIG. 11 after rotation of the carousel.

If the slide 102 is loaded into the slot 90 with the predetermined orientation, a cut-out portion 80 of the slide 102 engages the block 96 in a complementary configuration to rest thereupon in the slot 90. However, in a manner similar to the slide 78 shown in FIG. 7, if the slide 102 is misoriented when being loaded into the open portion 98, the cut-out portion 80 of the slide 102 does not engage the block 96, and so the slide 102 extends out of the open portion 98 of the slot 90, which indicates misorientation to the operator. It is understood that, while a parallelepiped unit is shown for block 96 as illustrated in FIGS. 11 and 14, a protruding element or surface such as a cylindrical structure having a convex cross-section may be used instead of a parallelepiped unit. An upper surface of such an element 96 may be planar, may be multi-planar such as triangular or hexagonal, or may be curved, provided that the cut-out portion 80 of the slide 102 has a correspondingly complementary surface or a sufficiently complementary surface. For example, a hexagonal cut-out portion 80 of the slide 102 may be sufficiently complementary to a triangular or semi-circular element 96.

The cover portion 100 prevents the slide 102 from being placed in the slot 90 in the open space 104 between the block 96 and a second wall 94 of the slot 90. FIG. 12 is a top view of FIG. 11, with FIG. 12 illustrating the slot 90 of the alternative embodiment along lines 4—4 of FIG. 1. The dotted line 106 in FIG. 12 illustrates the edge of the cover portion 100, such that the slide 102 engages the block 96 to be loaded into the slot 90. Accordingly, the length 108 of the block 96 which extends into the slot 90, as measured from the first wall 92, is greater than the width 110 of the open portion 98, but less than the width 112 of the slot 90. The width 114 of the cover portion 100, being the difference in the width 110 and the width 112, is also to be greater than the width of the slide 102, such that the open space 104 forms a passage between the block 96 and the second wall 94 for passing of the slide 102 therethrough when the slot 90 is positioned over the receiving slot 28.

Figure 13:
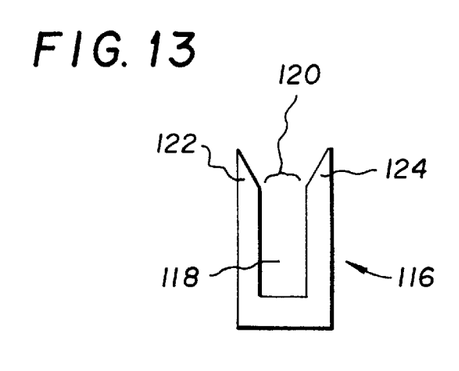
FIG. 13 is a side plan view of a removal arm.
Figure 15:
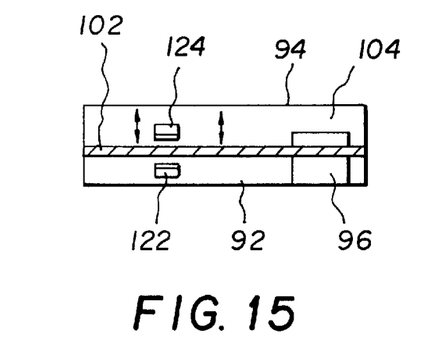
FIG. 15 is a top plan view of the slot in FIG. 14.

With the slide 102 engaging the block 96, when the slot is positioned over the receiving slot 28, the disclosed slide projector 10 includes a removal arm 116, as shown in FIGS. 13–15, which has a central slot 118 formed between extending arms thereof. The width 120 of the central slot 118 is generally greater than the width 112 of the slide 102. The removal arm 116 has tapered ends 122 and 124 to allow one of the tapered ends 122 to move between the first wall 92 and the slide 102 when the removal arm 116 is lifted upward from the housing 14 and through the receiving slot 28 to remove the slide 102 from the block 96, as shown in FIGS. 14 and 15.

FIG. 15 is a top view of the slot 90 in FIG. 14, illustrating the slot 90 of the alternative embodiment along the lines 5—5 of FIG. 1, in which the slot 90 with the slide 102 has at least the open space 104 positioned over the receiving slot 28. FIGS. 14 and 15 are reverse angle views of the slot 90 in FIGS. 11 and 12, respectively, representing the re-orientation of the slot 90 after rotation of the carousel 16.

With the tapered end 122 between the slide 102 and the first wall 92, motion of the removal arm 116 away from the first wall 92 causes the tapered end 122 to move the slide 102 and its cut-out portion off of the block 96 to disengage from the block 96 to permit the slide 102 to pass through the open space 104 into the receiving slot 28. The removal arm 116 may then carry the slide 102 downward into the receiving area, or may disengage the slide 102 to allow the slide 102 to fall into the receiving area and/or to engage the rollers 20.

To eject the slide 102, the removal arm 116 engages the bottom of the slide 102 and lifts the slide 102 upward through the open space 104 such that at least a portion of the cut-out portion 80 of the slide 102 is positioned above a top surface of the block 96. Motion of the removal arm 116 toward the first wall 92 causes the tapered end 124 to move the slide 102 over the block 96. The cut-out portion 80 of the slide 102 may then engage the block 96 in a complementary manner, as shown in FIG. 14, to return the slide 102 to rest within the slot 90 during rotation of the carousel 16.

Figure 16:
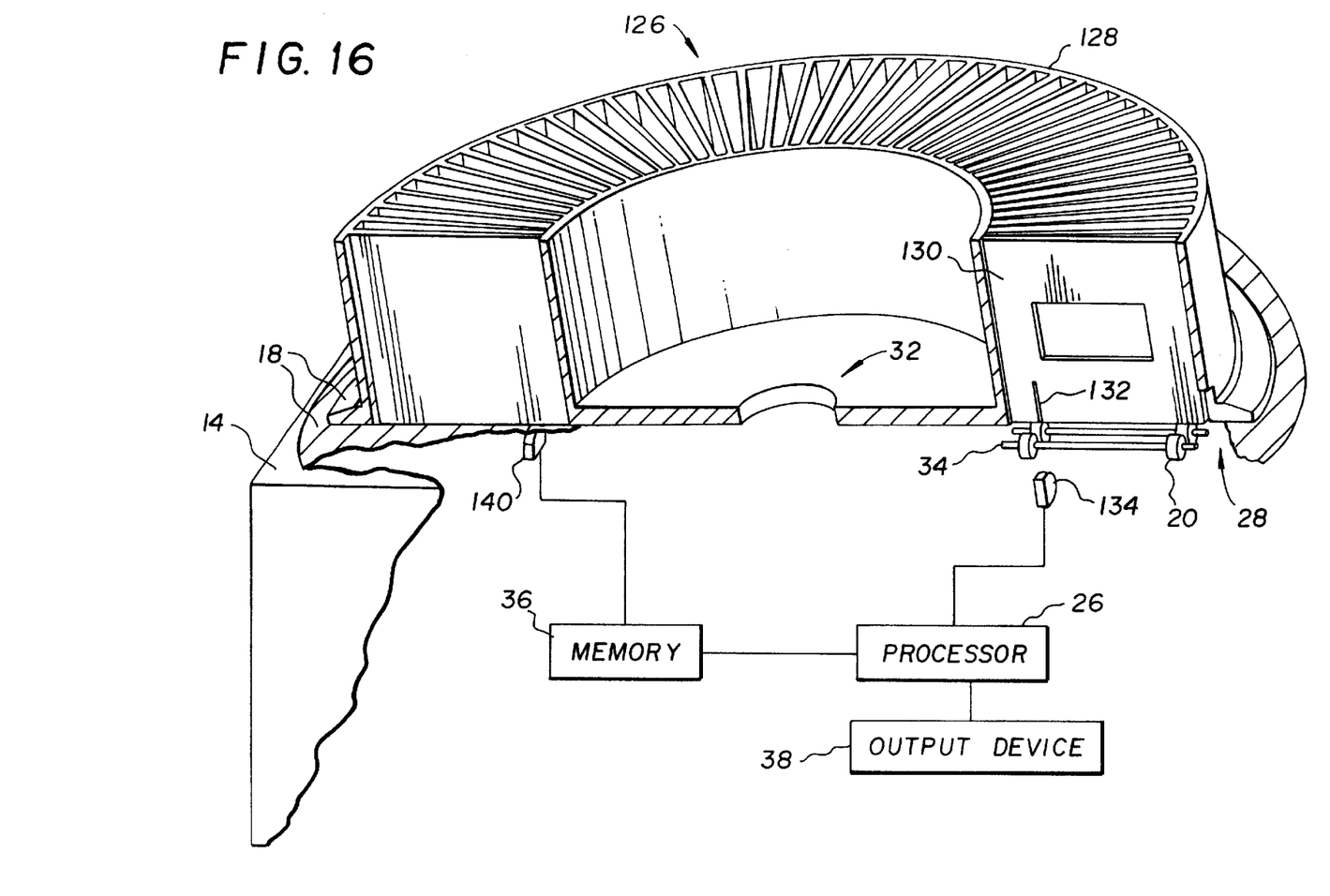
FIG. 16 is a perspective cut-away view of an alternative embodiment of a projector using magnetic materials and magnetic head to determine orientations of slides.
Figure 17:
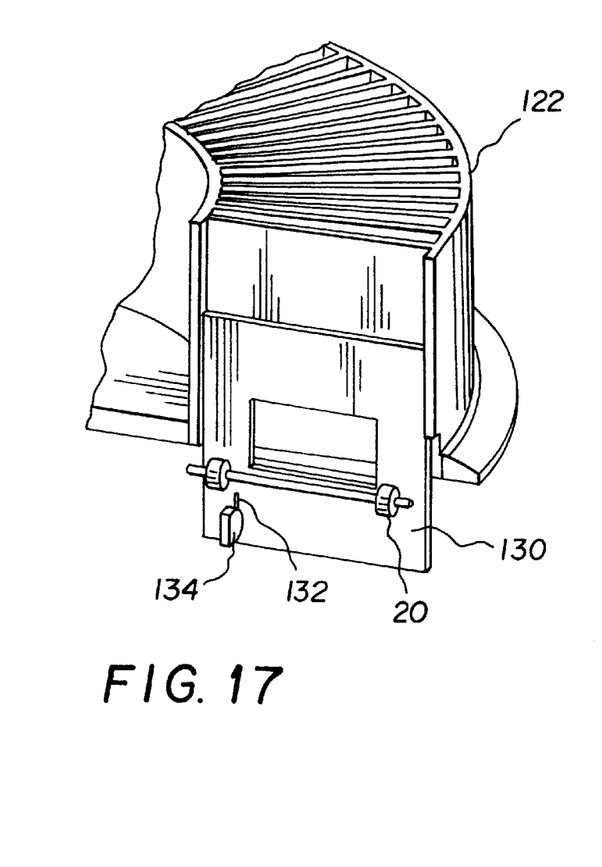
FIGS. 17 and 18 are perspective cross-sectional views of a slide with magnetic material being received and read by a magnetic head.
Figure 18:
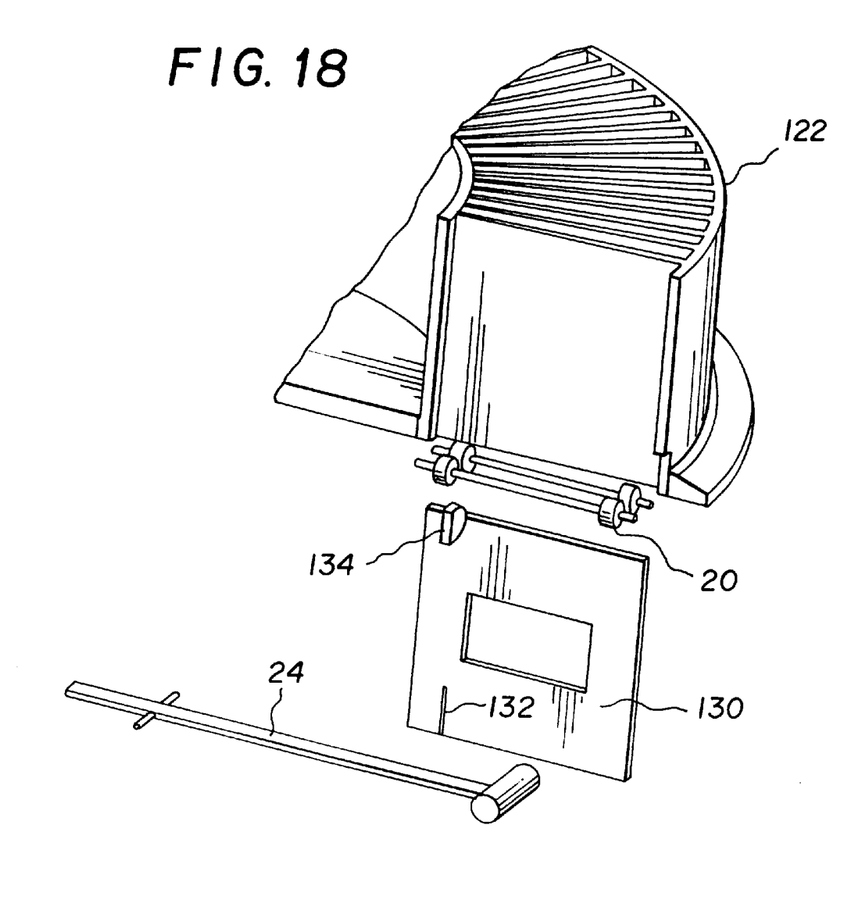

In another alternative embodiment of the disclosed projector having a predetermined orientation feature, the disclosed projector 126 shown in FIG. 16 includes a carousel 128 as in the prior art which rotates on a base 18 mounted on a housing 14. The slides 130 for use in this alternative projector 126 include at least one region of magnetic material 132 positioned on the slide mount of the slide 130 in a predetermined location. A magnetic head 134 is positioned therein substantially adjacent to the path of the slide 130. When the slide 130 drops down into the receiving area of the projector 126, as shown in FIGS. 17 and 18, the magnetic material 132 may be detected by the magnetic head 134.

If the magnetic material 132 is indeed detected by the magnetic head 134, the magnetic head 134 may generate detection signals indicating that the slide 130 is properly oriented in the receiving area. The detection signals are received and processed by the processor 26, which may then generate an appropriate status message, using data stored in the memory 36, for output by the output device 38, such as an indicator, a display and/or audio speaker, as described above. The processor 26 then generates appropriate imaging control signals to cause the disclosed projector 126 to perform image generation from the properly oriented slide 130 using a light source. The slide 130 may then be ejected by the slide push lever 24, as described above.

When the slide 130 passes the magnetic head 134, if the magnetic head 134 does not detect any magnetic material, the lack of detection may indicate misorientation of the slide 130. The magnetic head 134 then generates appropriate detection signals, or even generates no signals at all, reflecting the lack of detection of magnetic material. Such detection signals or lack thereof is then processed by the processor 26, which responds by preventing the disclosed projector 126 from performing image generation from the misoriented slide 130. The processor 26 then generates an appropriate misorientation status message using the data stored in the memory 36 for output by the output device 38.

With the misoriented slide 130 positioned in the receiving area but prevented from having images generated therefrom, the processor 26 then activates the slide push motor 22 to eject the slide 130 using the slide push lever 24. In this manner, the slides 130 are magnetically processed by the disclosed projector 126, with properly oriented slides being accepted and having images generated therefrom, and with misoriented slides being rejected and having no images generated therefrom.

It is understood that more than one region of magnetic material may be disposed on the slide 130, as described in commonly assigned U.S. patent application Ser. No 08/896, 844, entitled: SLIDE WITH MAGNETIC MARKS THAT CAN BE READ BY MULTIPLE HEADS, and filed in the names of Dale McIntyre, Daniel Pagano, David Patton, and Edward Weissberger, which is incorporated by reference. Accordingly, the regions of magnetic material may store encoded data indicating that the slide is oriented properly or improperly when the magnetic head 134 reads the encoded data therefrom. When such a slide with multiple regions of magnetic material is received in the receiving area and read by the magnetic head 134, only one region has data indicating that the magnetic head 134 is reading data from a slide 130 in the proper orientation. Any other magnetic material on the slide 130 may store data indicating to the magnetic head 134 that the slide 130 is misoriented.

In response to such encoded data, the processor 26 may determine whether or not the slide is properly oriented, and then accepts or rejects the slide. If a slide is accepted, the processor 26 processes the images on the accepted slide, as described above.

The use of a magnetic head 134 and regions of magnetic material on the slides, as shown in FIG. 16, may also be implemented in combination with the slide projector 10 shown in FIG. 1. The detection of magnetic material on slides may be used in conjunction with the described rail 50 and actuator lever 40. For example, non-standard size slides may be shorter in height yet may lack a cut-out portion, and so may not present a portion such as the portion 84 in FIG. 7 extending out of the carousel 16. Accordingly, such non-standard and non-notched slides may be accepted into the slide projector 10 in FIG. 1, despite the use of the rail 50. Magnetic material disposed on the slides and the lack of detection thereof may be used as a redundant check on the orientation of the slides received into the receiving area. Thus, misoriented slides not initially rejected by the use of the rail 50 may still be prevented from being imaged to generate misoriented images by using the magnetic head 134 and the processor 26 connected thereto.

Figure 19:
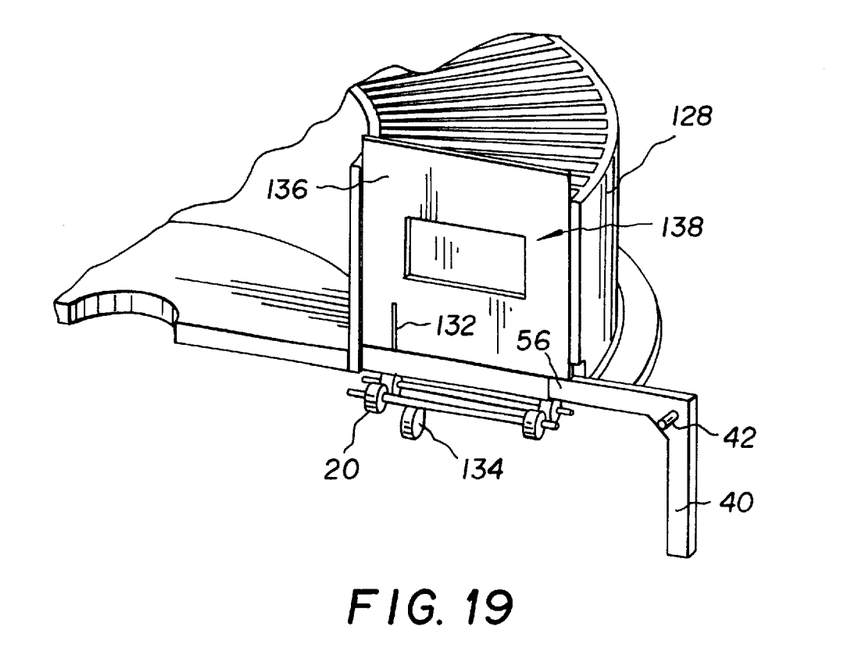
FIG. 19 is a perspective cross-sectional view of a slide with magnetic material being ejected from the carousel.

In another alternative embodiment, the disclosed projector 126 in FIG. 16 may include the actuator lever 40 and actuating motor 44 as shown and described in FIG. 1 to eject the misoriented slide, as determined by the magnetic material 132, from the carousel 128. As shown in FIG. 19, by using slides with magnetic regions and no cut-out regions, the pivoting of the first end 56 of the actuator lever 40 may be used to raise a portion 136 of the rejected slide 138 above the slot in the carousel 128 to permit an operator to remove and re-orient the rejected slide 138. Alternatively, the actuator lever 40 may be used as an extra operating feature for ejecting any slide from the carousel 128, whether the slide is correctly oriented or not. Such ejection from the carousel 128 may be arbitrarily controlled by the operator using an input device for inputting an eject slide signal, which is processes by the processor 26 to control the actuating motor 44, as described above.

Figure 20:
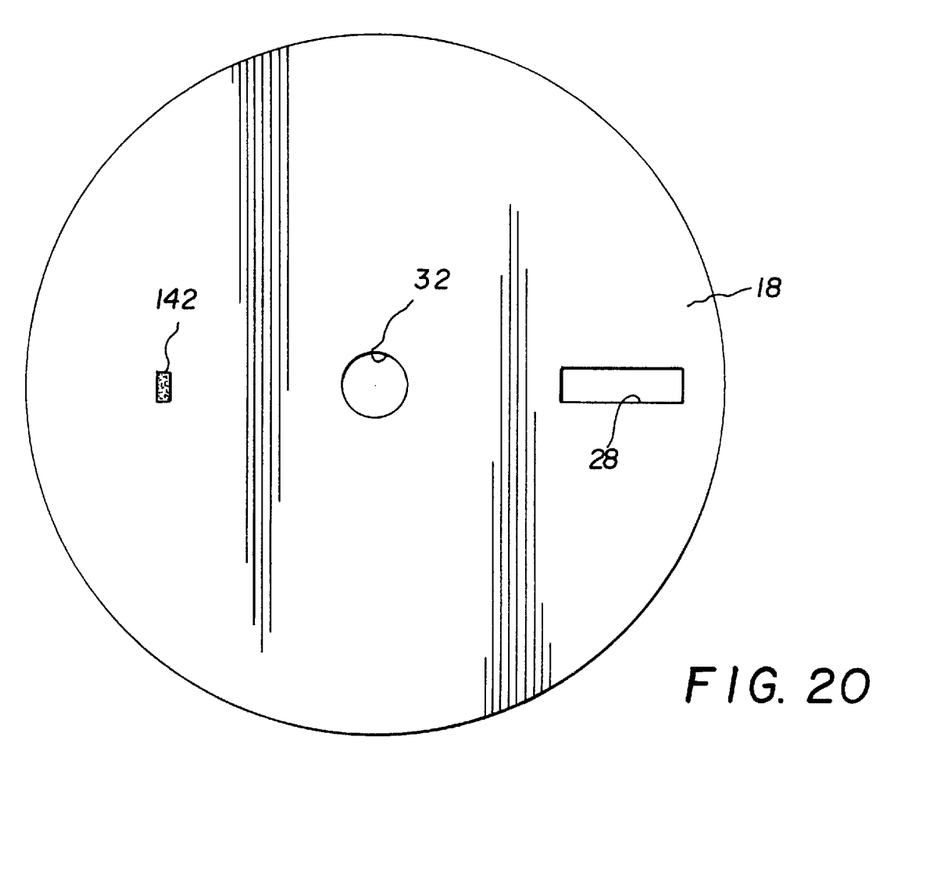
FIG. 20 is a bottom plan view of a base having a portion of magnetic material encoding identification data.

In another embodiment, either of the disclosed slide projector 10 shown in FIG. 1 or the disclosed projector 126 shown in FIG. 16 may include a second magnetic head 140 for detecting a region 142 of magnetic material on the underside of the base 18, as shown in FIG. 20. The region 142 may be positioned anywhere on the underside of the base 18, provided that such positioning of the region 142 is complementary to the position of the second magnetic head 140 having a detection portion protruding from the top of the housing 14. That is, when the base 18 is mounted on the housing 14, the region 142 is to be positioned substantially adjacent to the second magnetic head 140 for reading thereof. The region 142 may store data identifying the plurality of slides being displayed; for example, the operator may encode a title of a presentation. The second magnetic head 140 reads the data stored therein, and the processor 26 generates an appropriate message using the output device 38, such as a text message on a display, or by other output techniques such as described above.

Accordingly, after mounting the base 18 with the carousel 16 or the carousel 128, the operator may be informed of the nature or title of the plurality of slides, and may accept or reject the slides, or re-orient a sequence of carousels of slides. For example, the operator may have a series of carousels of slides with respective bases in a particular sequence. The use of identifying magnetic regions 142 on each base may be used to preserve the sequence of carousels.

While the disclosed orientation slide projector and slides are particularly shown and described herein with reference to the preferred embodiments thereof, it is to be understood that various modifications in form and detail may be made without departing from the scope and spirit of the present invention. The invention has been described in detail with particular reference to certain preferred embodiments thereof, but it will be understood that variations and modifications can be effected within the spirit and scope of the invention.

PARTS LIST

10 slide projector
12 slide
14 housing
16 carousel
18 base
20 roller
22 slide push motor
24 slide push lever
26 processor
28 receiving slot
30 slots in carousel
32 central aperture
34 axle of rollers
36 memory
38 output device
40 actuator lever
42 pins
44 actuating motor
46 cavities in slot walls
48 walls of the slots
50 rail
52 end of rail
54 end of rail
56 first end of actuator lever
58 channel portion
60 channel portion
62 inner peripheral surface of carousel
64 outer peripheral surface of carousel
66 width of rail
68 distance of rail from outer peripheral surface
70 portion of outer peripheral surface
72 base for pins
74 first edge of first end
76 inner edges of ends of rail
78 misoriented slide
80 cut-out portion
82 edge or surface of slide
84 portion extending out of slot
86 bottom surface of slide
88 engaging end of slide push lever
90 alternative slot
92 first wall of slot
94 second wall of slot
96 rectangular cross-sectional cylindrical block
98 open portion
100 cover portion
102 slide
104 open space
106 dotted line
108 length of block
110 width of open portion
112 width of slot
114 width of cover portion
116 removal arm
118 central slot
120 width of central slot
122 tapered end
124 tapered end
126 alternative projector using magnetic feature
128 carousel 130 slide with magnetic material
132 magnetic material
134 first magnetic head
136 raised portion
138 rejected slide
140 second magnetic head
142 magnetic material on underside of base

What is claimed is:

1. A film slide projector for generating images from film slides stored in slots of a movable slide holder rotatable about an axis, the film slide projector comprising:

a housing;

a non-rotatable base having a groove and a receiving slot, wherein the movable slide holder moves each film slide over a receiving slot for passage therethrough to be positioned near an imaging light source for generating the images; and a rail mounted on the base and engaging the movable slide holder in a complementary manner, wherein a surface of the rail contacts a surface of each film slide in the movable slide holder with misoriented film slides being moved by the surface of the rail to expose a portion of such misoriented film slides outside of respective slots of the movable slide holder to indicate such misorientation, and with film slides having a predetermined proper orientation being completely contained within respective slots.

2. The film slide projector of claim 1 wherein the rail has a generally annular shape terminating at positions on either side of the receiving slot to form a space therebetween.

3. The film slide projector of claim 2 further comprising:

an actuator lever having a first end positioned within the space at the terminal portions of the rail and pivotable between a first pivoted position and a second pivoted position, wherein the actuator lever in the first pivoted position prevents a film slide positioned thereupon from entering the receiving slot, and the actuator lever in the second pivoted position allows the film slide to enter the receiving slot.

4. The film slide projector of claim 3 wherein the first end of the actuator lever is positioned to form in the space a substantially contiguous surface with the rail to allow the film slides to slide upon the actuator lever from the rail in response to movement of the movable slide holder.

5. The film slide projector of claim 1 wherein the movable slide holder includes a plurality of walls forming a plurality of slots for positioning film slides therein, with each of the plurality of walls having a cavity for engaging the rail in the complementary manner.

6. The film slide projector of claim 5 wherein the cavities of the walls of the movable slide holder slidably engage the rail during rotation of the movable slide holder.

7. The film slide projector of claim 1 wherein each film slide includes a cut-out portion, such that each film slide positioned in a predetermined proper orientation in a respective slot has a respective cut-out portion engaging the rail in a complementary manner, and wherein each film slide misoriented in a respective slot to not be in the predetermined proper orientation has a respective cut-out portion not engaging the rail.

8. A film slide projector for generating images from film slides, the film slide projector comprising:

a housing;

a non-rotatable base having a groove and a receiving slot;

a movable slide holder having:

a plurality of walls forming a plurality of slots;

a plurality of cylindrical elements, with each cylindrical element protruding from a respective wall into a respective slot; and a plurality of cover portions, each forming a respective open aperture of each slot over a respective cylindrical element for receiving a respective film slide to be positioned in the respective slot upon the respective cylindrical element; and wherein the cylindrical elements cause misoriented film slides positioned thereupon to have a respective portion thereof extending through a respective open aperture to indicate misorientation, and causes the film slides in a predetermined proper orientation in respective slots to be completely contained within the respective slots.

9. The film slide projector of claim 8 wherein each film slide includes a cut-out portion, such that each film slide positioned in a predetermined proper orientation in a respective slot has a respective cut-out portion engaging the respective cylindrical element in a complementary manner, and wherein each film slide misoriented in a respective slot to not be in the predetermined proper orientation has a respective cut-out portion not engaging the respective cylindrical element.

10. The film slide projector of claim 9 further comprising:

a removal arm for engaging each film slide having a respective cut-out portion engaging the respective cylindrical element in a complementary manner, to move the respective film slide off of the respective cylindrical element to allow passage of the respective film slide into the receiving slot.

11. The film slide projector of claim 10 wherein the removal arm engages a film slide in the housing to move the film slide into an empty slot in the movable slide holder and to place the film slide onto a respective cylindrical element with the cut-out portion of the film slide engaging the respective cylindrical element in a complementary manner.

12. A film slide projector for generating images from film slides stored in slots of a movable slide holder rotatable about an axis, the film slide projector comprising:

a housing;

a non-rotatable base having an annular groove and a receiving slot, wherein the movable slide holder moves to slide within the annular groove to move each film slide over a receiving slot for passage therethrough to be positioned near an imaging light source for generating the images;

a contact sensor for generating detection signals indicating only whether or not a film slide is present in the receiving slot; and a processor, responsive to the detection signals, for determining whether or not the received film slide is in a predetermined proper orientation, and for controlling the generation of images from the received film slide upon the determination of the orientation of the received film slide.

13. A film slide projector for generating images from film slides stored in slots of a movable slide holder rotatable about an axis, the film slide projector comprising:

a housing:

a non-rotatable base having an annular groove and a receiving slot, wherein the movable slide holder moves to slide within the annular groove to move each film slide over a receiving slot for passage therethrough to be positioned near an imaging light source for generating the images;

a first magnetic head for generating detection signals indicating whether or not a region of magnetic material is present on a film slide being received in the receiving slot;

a processor, responsive to the detection signals, for determining whether or not the received film slide is in a predetermined proper orientation, and for controlling the generation of images from the received film slide upon the determination of the orientation of the received film slide; and a slide push lever, responsive to ejection control signals generated by the processor upon determination that a received slide is misoriented, for ejecting the misoriented received film slide to return to an empty slot in the movable slide holder.

14. The film projector of claim 13 further comprising:

an output device, responsive to output signals from the processor upon determination of the orientation of the received film slide, for generating and outputting a corresponding orientation status message.

15. The film projector of claim 14 wherein the output device is a display for displaying a text message indicating the orientation of the received film slide.

16. The film projector of claim 14 wherein the output device is at least one indicator light which, upon illumination or non-illumination, indicates the orientation of the received film slide.

17. The film projector of claim 14 wherein the output device is a speaker for generating an audio message indicating the orientation of the received film slide.

18. The film projector of claim 13 further comprising:

an actuator lever, responsive to control signals from the processor, for lifting the ejected slide out of the movable slide holder to expose a portion thereof to indicate misorientation of the ejected film slide.

19. The film projector of claim 13 further comprising:

an output device;

a second magnetic head, responsive to a region of magnetic material disposed on the base, for generation data signals; and wherein the processor, responsive to the data signals, causes the output device to generate an identification message associated with the film slides in the movable slide holder corresponding to the region of magnetic material.

20. A film slide projector for generating images from film slides stored in slots of a movable slide holder rotatable about an axis, the film slide projector comprising:

a housing;

a non-rotatable base having an annular groove and a receiving slot, wherein the movable slide holder moves to slide within the annular groove to move each film slide over a receiving slot for passage therethrough to be positioned near an imaging light source for generating the images;

a first magnetic head for generating detection signals indicating whether or not a region of magnetic material is present on a film slide being received in the receiving slot;

a processor, responsive to the detection signals, for determining whether or not the received film slide is in a predetermined proper orientation, and for controlling the generation of images from the received film slide upon the determination of the orientation of the received film slide;

an output device; and a second magnetic head, responsive to a region of magnetic material disposed on the base, for generation data signals;

wherein the processor, responsive to the data signals, causes the output device to generate an identification message associated with the film slides in the movable slide holder corresponding to the region of magnetic material;

wherein the region of magnetic material disposed on the base is positioned on an underside of the base; and wherein the second magnetic heads has a detection surface positioned to be substantially adjacent to the region of magnetic material for reading encoded identification data therefrom.

21. The film projector of claim 12 wherein said contact sensor is a pressure sensor.

* * * * *